(No Model.)
F. E. BAKER.
COFFEE POT.
No. 349,199. Patented Sept. 14, 1886.
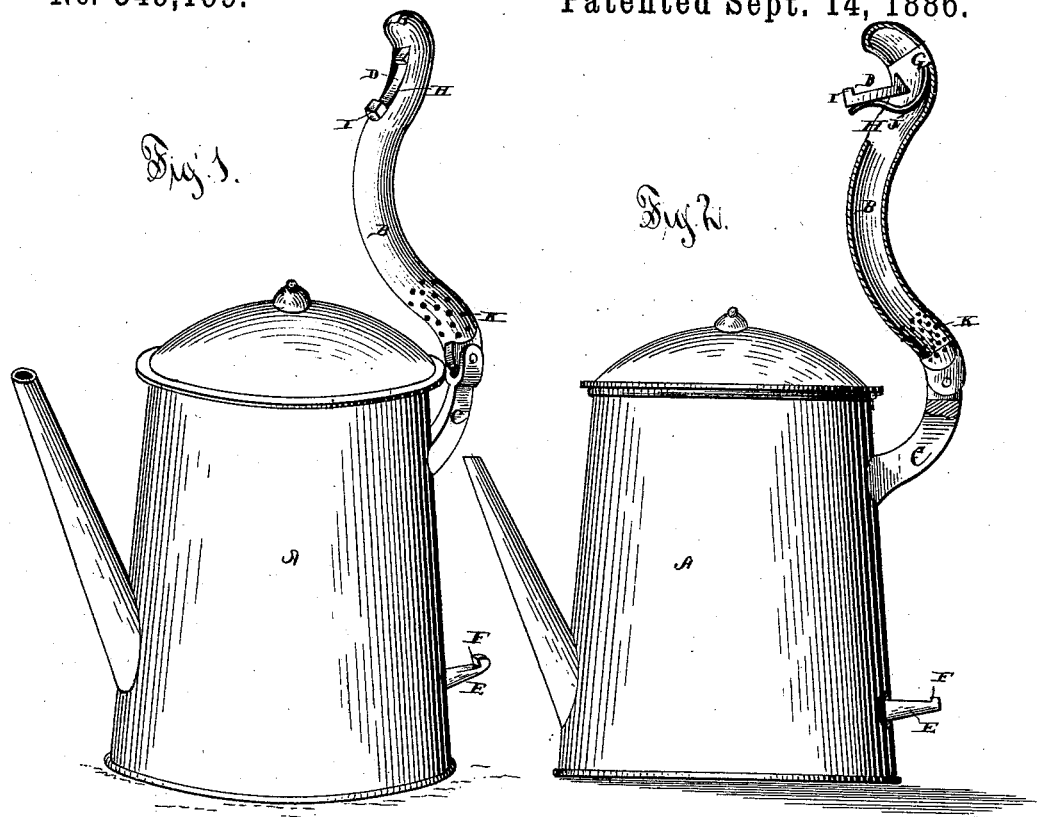
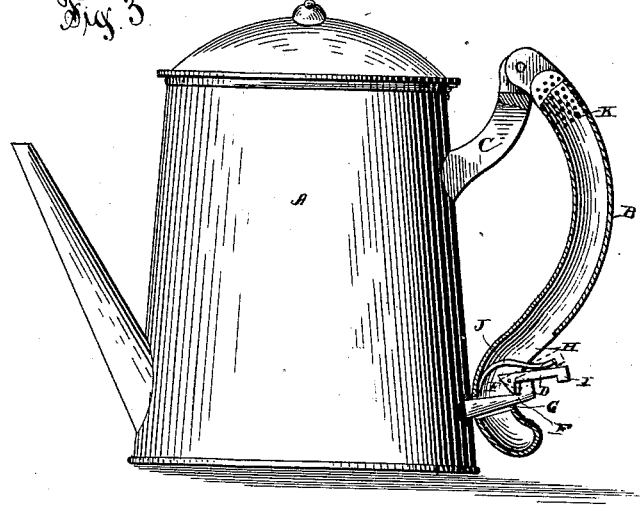
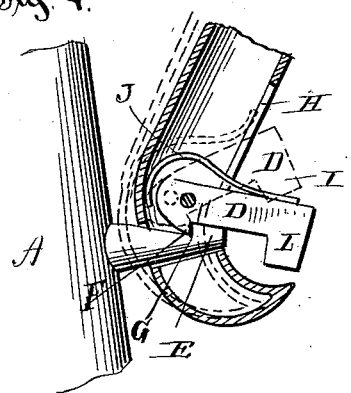
WITNESSES
F. L. Ourand
Edward Stanton
INVENTOR
Frank E. Baker,
By Louis Bagger & Co.
Attorneys

UNITED STATES PATENT OFFICE.

FRANK E. BAKER, OF AKRON, OHIO.

COFFEE-POT.

SPECIFICATION forming part of Letters Patent No. 349,199, dated September 14, 1886.

Application filed April 6, 1886. Serial No. 197,987. (No model.)

*To all whom it may concern:*

Be it known that I, FRANK E. BAKER, a citizen of the United States, and a resident of Akron, in the county of Summit and State of Ohio, have invented certain new and useful Improvements in Coffee-Pots; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view of a coffee-pot provided with my improved handle, showing the handle tilted upward. Fig. 2 is a vertical sectional view of the same. Fig. 3 is a similar view showing the handle locked in position, and Fig. 4 is a sectional detail view of the lower end of the handle and the catch or lock.

Similar letters of reference indicate corresponding parts in all the figures.

My invention has relation to handles for coffee-pots or similar vessels; and it consists in the improved construction and combination of parts of a handle, which is hinged at its upper end to the pot and provided with a catch at its lower end, so that the handle may be tilted upward when the pot is placed upon a stove or over a fire, keeping the handle cool, as hereinafter more fully described and claimed.

In the accompanying drawings, the letter A indicates the pot, and B is the handle, which is preferably tubular, although it may be made solid, if so desired. This handle is pivoted or hinged at its upper end to the upper portion of the pot, being preferably pivoted to a lug, C, projecting from the pot, and the lower end of the handle is provided with a catch, D, which may engage a lug, E, projecting from the pot. This lug is preferably formed with a lip or point, F, which fits into a perforation, G, in the lower end of the handle, and a catch, D, is pivoted near its lower end in a recess, H, in the handle, and has its lower end engaging the notch, while its upper end is formed with a head, I, the gravity of which, together with the force of a flat spring, J, bearing against it, will force the catch outward at the upper end, causing it to engage the notch with its lower end.

When the catch is to be relieved, the upper headed end of the catch is pressed upwardly, which causes the point F to be raised out of the notch G, and the handle may be tilted to stand upright, or nearly so, out of reach of the fire over which the pot is placed. When the point F is being raised out of the notch G, the end of the handle B is forced in toward the coffee-pot, as shown in dotted lines in Fig. 4. The handle is preferably tubular and has preferably perforations K at its upper end, through which perforations the air may enter when the handle is tilted upward, escaping at the apertures at the free end, which is now tilted up in the air, and the air passing through the tubular handle will thus cool the handle while the pot is over the fire. The handle may, however, be hollow or solid, as it may be desired, and it may be manufactured of any desired material, and any convenient catch which will engage automatically, and which may be easily disengaged, may be used, although I prefer the form herein described.

It follows that, although I have described the handle as being preferably intended for coffee-pots, it may be used for any similar vessel, the handle being capable of being tilted out of reach of the heat when the vessel is placed over a fire.

Having thus described my invention, I claim and desire to secure by Letters Patent of the United States—

1. In combination with a coffee-pot or similar vessel, a handle hinged at its upper end near the upper end of the pot and having a catch at its lower end for engaging the pot, as and for the purpose shown and set forth.

2. In combination with a coffee-pot or similar vessel, a tubular handle hinged at its upper end near the upper end of the pot and having a catch at its lower end for securing it to the pot, as and for the purpose shown and set forth.

3. In a coffee-pot or similar vessel, the combination of a handle pivoted at its upper end to the upper end of the pot and having a perforation at its lower end, a lug projecting from the pot and having a notch in its upper side entering the perforation, and a catch pivoted near its lower end in a recess in the handle engaging the notch of the lug and having an outwardly-bent upper end formed with a weighted head, as and for the purpose shown and set forth.

4. In a coffee-pot or similar vessel, the combination of a handle pivoted at its upper end to the upper end of the pot and having a perforation in its lower end, a lug projecting from the pot and having a notch in its upper side entering the perforation, and a catch pivoted near its lower end in a recess in the handle engaging the notch of the lug with the lower end and having a spring bearing against its upper end forcing it out of the recess, as and for the purpose shown and set forth.

In testimony that I claim the foregoing as my own I have hereunto affixed my signature in presence of two witnesses.

FRANK E. BAKER.

Witnesses:
LOUIS BAGGER,
GEO. E. FRECH.